US011240155B2

(12) United States Patent
Bernat et al.

(10) Patent No.: US 11,240,155 B2
(45) Date of Patent: Feb. 1, 2022

(54) TECHNOLOGIES FOR NETWORK DEVICE LOAD BALANCERS FOR ACCELERATED FUNCTIONS AS A SERVICE

(71) Applicant: Intel Corporation, Santa Clara, CA (US)

(72) Inventors: Francesc Guim Bernat, Barcelona (ES); Karthik Kumar, Chandler, AZ (US); Ned M. Smith, Beaverton, OR (US); Monica Kenguva, Phoenix, AZ (US); Rashmin Patel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,430

(22) Filed: Mar. 29, 2019

(65) Prior Publication Data

US 2019/0222518 A1   Jul. 18, 2019

(51) Int. Cl.
| G06F 15/16 | (2006.01) |
| G06F 9/54 | (2006.01) |
| H04L 29/06 | (2006.01) |
| H04L 12/803 | (2013.01) |
| H04L 12/851 | (2013.01) |
| H04L 12/26 | (2006.01) |
| H04L 12/927 | (2013.01) |
| H04L 12/813 | (2013.01) |
| H04L 29/08 | (2006.01) |

(52) U.S. Cl.
CPC ............ *H04L 47/125* (2013.01); *H04L 43/08* (2013.01); *H04L 47/20* (2013.01); *H04L 47/2425* (2013.01); *H04L 47/805* (2013.01); *H04L 67/1008* (2013.01)

(58) Field of Classification Search
CPC ..... H04L 41/5003; H04L 43/08; H04L 47/20; H04L 47/2425; H04L 47/80
USPC ........................................................ 709/223
See application file for complete search history.

(56) References Cited

U.S. PATENT DOCUMENTS

| 7,343,399 | B2* | 3/2008 | Hayball | H04L 29/06 709/219 |
| 7,584,262 | B1* | 9/2009 | Wang | H04L 12/4625 709/217 |
| 8,724,626 | B1* | 5/2014 | Caputo, II | H04L 45/50 370/389 |
| 2002/0199012 | A1* | 12/2002 | Cable | H04L 67/1021 709/233 |
| 2006/0116988 | A1* | 6/2006 | Toebes | H04L 67/1021 |
| 2010/0036954 | A1* | 2/2010 | Sakata | H04L 67/1002 709/226 |

(Continued)

*Primary Examiner* — Hamza N Algibhah
(74) *Attorney, Agent, or Firm* — Hanley, Flight & Zimmerman, LLC

(57) ABSTRACT

Technologies for load balancing on a network device in an edge network are disclosed. According to one embodiment, a network device receives, in the edge network, a request to access a function. The request includes one or more performance requirements. The network device identifies, as a function of an evaluation of the performance requirements and on monitored properties of each device associated with the network device, one or more of the devices to service the request. The network device selects one of the identified devices according to a load balancing policy and sends the request to the selected device.

15 Claims, 7 Drawing Sheets

(56) References Cited

U.S. PATENT DOCUMENTS

| | | | |
|---|---|---|---|
| 2012/0096183 A1* | 4/2012 | Mercuri | H04L 47/2425 709/241 |
| 2013/0227547 A1* | 8/2013 | Little | G06F 8/60 717/177 |
| 2013/0310108 A1* | 11/2013 | Altman | H04W 8/18 455/552.1 |
| 2014/0233387 A1* | 8/2014 | Zheng | H04L 47/125 370/235 |
| 2014/0337417 A1* | 11/2014 | Park | H04L 29/08234 709/203 |
| 2015/0057044 A1* | 2/2015 | Altman | H04M 15/8055 455/558 |
| 2015/0358236 A1* | 12/2015 | Roach | H04L 41/0896 370/235 |
| 2015/0358401 A1* | 12/2015 | Flavel | H04L 61/1511 370/235 |
| 2016/0094456 A1* | 3/2016 | Jain | H04L 47/125 370/235 |
| 2016/0164787 A1* | 6/2016 | Roach | H04L 43/065 370/235 |
| 2017/0019369 A1* | 1/2017 | Ravinoothala | H04L 47/125 |
| 2017/0026461 A1* | 1/2017 | Boutros | H04L 45/121 |
| 2017/0201571 A1* | 7/2017 | Sherf | H04L 67/1029 |
| 2017/0324813 A1* | 11/2017 | Jain | G06F 9/5016 |
| 2019/0007321 A1* | 1/2019 | Fedyk | H04L 61/6022 |
| 2019/0014040 A1* | 1/2019 | Yerrapureddy | H04L 12/46 |
| 2019/0028552 A1* | 1/2019 | Johnson, II | H04L 67/16 |
| 2019/0044886 A1* | 2/2019 | Bernat | H04L 41/0823 |
| 2019/0079804 A1* | 3/2019 | Thyagarajan | G06F 9/45533 |
| 2019/0138481 A1* | 5/2019 | Balle | G06F 13/4027 |
| 2019/0141119 A1* | 5/2019 | Bernat | H04L 41/5006 |
| 2019/0158606 A1* | 5/2019 | Guim Bernat | H04W 4/70 |
| 2019/0208009 A1* | 7/2019 | Prabhakaran | H04L 67/16 |
| 2019/0320040 A1* | 10/2019 | Kottapalli | H04L 67/12 |
| 2019/0377592 A1* | 12/2019 | Verma | G06F 9/5027 |
| 2020/0007388 A1* | 1/2020 | Johnston | H04L 45/38 |
| 2020/0007460 A1* | 1/2020 | Guim Bernat | G06F 9/5077 |
| 2020/0382621 A1* | 12/2020 | Moreira | H04L 67/2809 |

* cited by examiner

TECHNOLOGIES FOR NETWORK DEVICE LOAD BALANCERS FOR ACCELERATED FUNCTIONS AS A SERVICE

BACKGROUND

Edge computing provides techniques for processing resources at a location in closer network proximity to a requesting device, as opposed to a centralized location in a cloud network. Doing so ensures that devices receive critical data relatively quickly. Further, service providers within an edge network may provide services accessible by edge devices for various applications. For example, a service provider may implement Function-as-a-Service (FaaS) services that an edge device may request. In particular, an edge device may send a request, to a FaaS service, to execute an accelerated function on accelerator devices hosted by the service provider. Doing so allows the edge device to carry out workload operations relatively faster than if the operations were performed on a traditional processor. Further, because the accelerated functions are carried out over the edge network, the edge device can receive the result of the accelerated function at a relatively low latency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
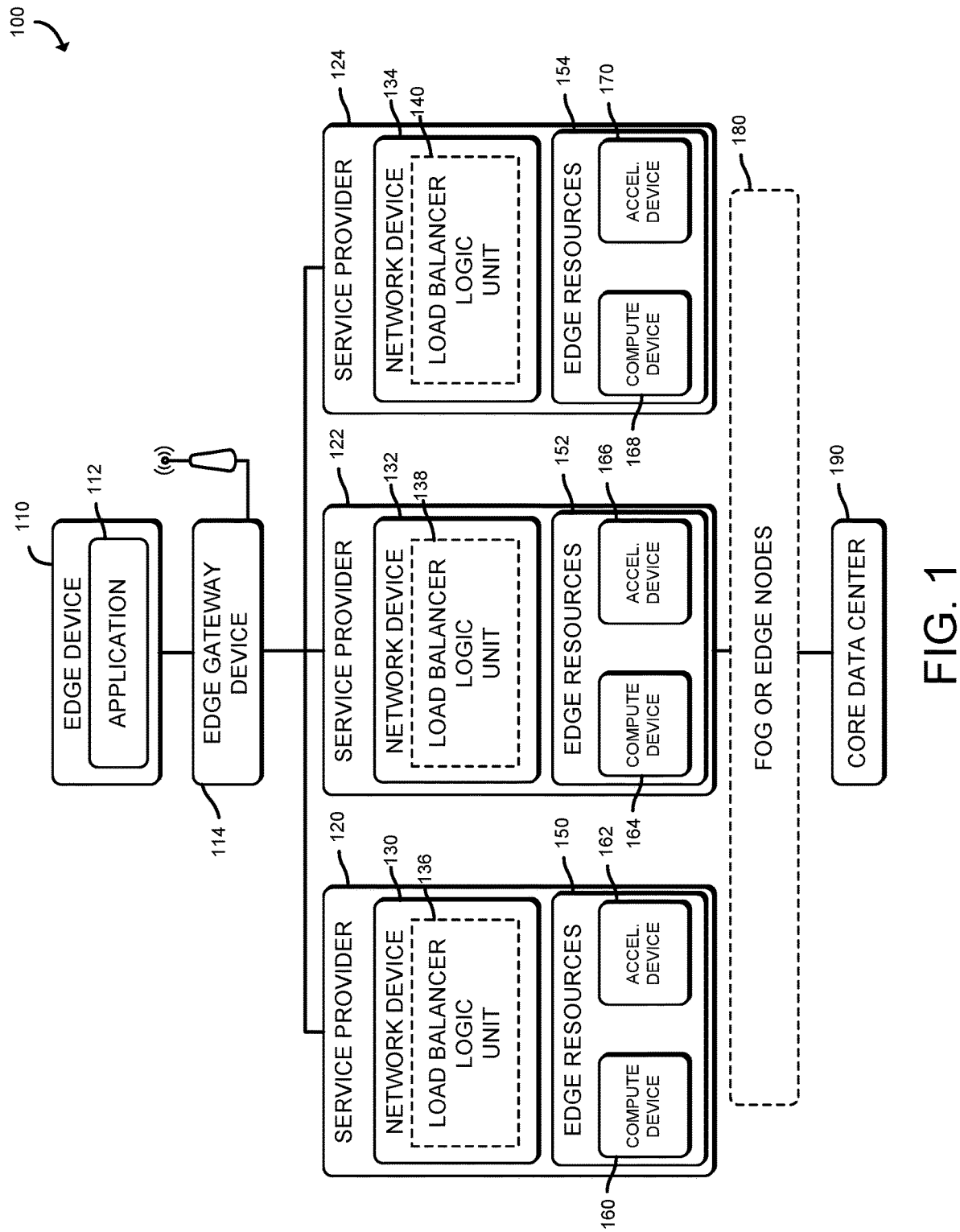
FIG. 1 is a simplified diagram of at least one embodiment of a system for load balancing service requests in an edge network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for load balancing service requests (e.g., Function-as-a-Service (FaaS) and Accelerated Function-as-a-Service (AFaaS) service requests) in an edge network is shown. Illustratively, the system 100 includes an edge device 110 in communication with an edge gateway device 114. The edge gateway device 114 may be embodied as any device capable of communicating data between the edge device 110 and one or more edge resources 150, 152, 154 (e.g., resources, such as compute devices and the components thereof, owned and/or operated by one or more service providers 120, 122, 124, respectively, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 164, 168 and accelerator devices 162, 166, 170), latencies, power usage, and costs (e.g., monetary costs) associated with utilizing those edge resources 150, 152, 154. The edge gateway device 130 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/ processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location operated by one of the service providers 120, 122, 124 (or to the fog or edge nodes 180 or core data center 190).

Further, edge resources 150, 152, 154 may provide Function-as-a-Service (FaaS) or Accelerated Function-as-a-Service (AFaaS) services to a requesting edge device 110. The edge device 110 may send requests to the FaaS services included as part of the edge resources 150, 152, 154. Each FaaS service allows the application 112 to access functions (or accelerated functions) hosted by the service providers 120, 122, 124. An accelerated function may be embodied as predefined bit stream data to be executed on an accelerator device provided by the edge resources 150, 152, 154, such as a field programmable gate array (FPGA), application specific integrated circuit (ASIC), graphics processing unit (GPU) etc.). Advantageously, an application 112 may request accelerated functions to accelerate execution of workload operations (e.g., AR/VR functions, machine learning functions, matrix operations, and so on).

Illustratively, network devices 130, 132, 134 are also provided within a set of service providers 120, 122, 124 to perform switching and load balancing functions for requests directed to the edge resources 150, 152, 144. More particularly, the network device 130, 132, 134 may determine which of the respective compute devices of the edge resources 150, 152, 154 should service the request according to one or more policies (such as a service level agreement (SLA), load balancing policy, quality-of-service (QoS) requirements, a combination of each the aforementioned policies, etc.). The network device 130, 132, 134 then transmits the request to a selected compute device for processing. In some embodiments, the network device 130, 132, 134 includes a load balancer logic unit 136, 138, 140 (respectively), which may be embodied as any device or circuitry to carry out load balancing tasks on behalf of the service provider.

Multiple edge resources (e.g., the compute devices 160, 164, 168 and accelerator devices 162, 166, 170) may provide a given FaaS service, such that different edge resources may provide seamless access to that service to the application 112 as the edge device 110 moves across different locations. The edge resources may provide mechanisms to sync edge services across locations. The edge device 110 may use application programming interfaces (APIs) to send the requests. Further, each of the edge resources may implement monitoring techniques that allow devices (e.g., the network devices 130, 132, 134) to obtain performance metrics therefrom.

As further described herein, the network device 130, 132, 134 may register each of the respective compute devices 160, 164, 168, accelerator devices 162, 166, 170 and FaaS services executing thereon. In an embodiment, the network device 130, 132, 143 provides an API accessible by a user (e.g., an operator of a data center) to configure service queues that can be mapped to one or more FaaS functions registered with the network device 130, 132, 134. A service queue may generally be embodied as any structure for storing and managing incoming service requests to be forwarded to one or more edge resources. In addition, the API allows the network device 130, 132, 134 to monitor the configured service queues for performance metrics, allowing the network device 130, 132, 134 to ensure that SLA and QoS requirements are met.

Figure 2:
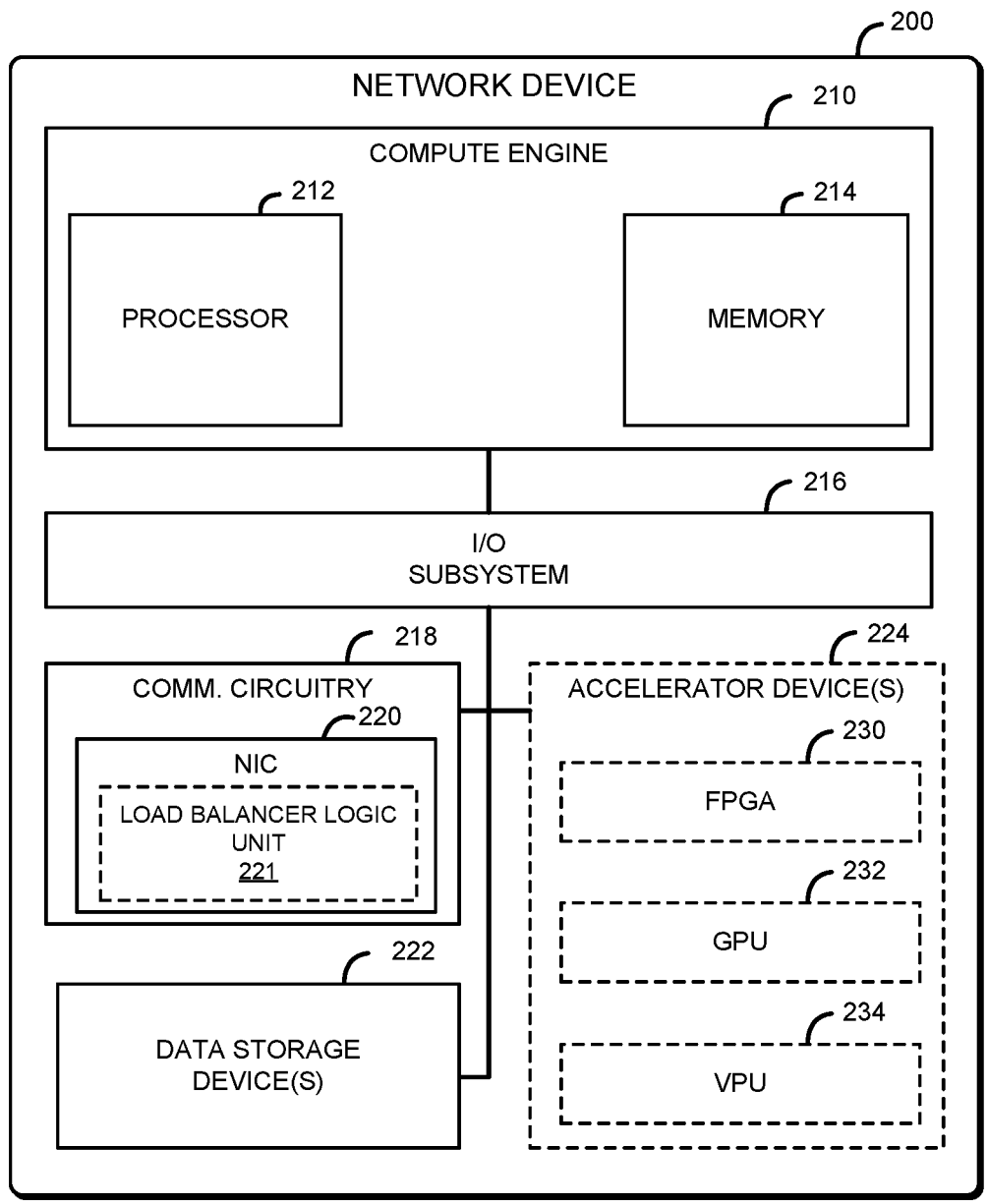
FIG. 2 is a simplified block diagram of at least one embodiment of a network device that may be included with the system described relative to FIG. 1.

Referring now to FIG. 2, a simplified block diagram of a network device 200 is shown. The network device 200 is representative of any of the network devices 130, 132, 134 described relative to FIG. 1. The network device 200 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). Further, the illustrative network device 200 includes a compute engine (also referred to herein as "compute engine circuitry") 212, an input/output (I/O) subsystem 216, communication circuitry 218, and one or more data storage devices 222. As described herein, the network device 200 may also include one or more accelerator devices 224. Of course, in other embodiments, the network device 200 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., processing service requests to edge resources of an edge device 110). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, other specialized hardware, or virtualized version thereof, etc., to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The compute engine 210 is communicatively coupled to other components of the network device 200 via the I/O subsystem 216, which may be embodied as circuitry and/or components to facilitate input/output operations with the compute engine 210 (e.g., with the processor 212 and/or the memory 214) and other components of the network device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the network device 200, into the compute engine 210.

The communication circuitry 218 may be embodied as any communication circuit, device, or collection thereof, capable of enabling communications over a network between the network device 200 and another compute device (e.g., the edge device 110, the edge gateway device 114, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the network device 200 to connect with another compute device (e.g., the edge device 110, the edge gateway device 114, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the network device 200 at the board level, socket level, chip level, and/or other levels. Illustratively, the NIC 220 includes a load balancer logic unit 221, which is representative of the load balancer logic unit 136, 138, 140 described relative to FIG. 1.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., the compute devices 160, 164, 168 and accelerator devices 162, 166, 170), the edge device 110, the edge gateway device 114, the fog nodes 180, and the core data center 190 may have components similar to those described in FIG. 2 with reference to the network device 200. The description of those components of the network device 200 is equally applicable to the description of components of the edge resources 150, 152, 154 (e.g., the compute devices 160, 162, 164, 166, 168, 170), the edge device 110, the edge gateway device 114, the fog nodes 180, and the core data center 190. Further, it should be appreciated that any of the edge resources 150, 152, 154 (e.g., the compute devices 160, 164, 168 and accelerator devices 162, 166, 170), the edge device 110, the edge gateway device 114, the fog nodes 180, and the core data center 190 may include other components, sub-components, and devices commonly found in a computing device, which are not discussed above in reference to the network device 200 and not discussed herein for clarity of the description. Further, it should be understood that one or more components of a compute device may be distributed across any distance, and are not necessarily housed in the same physical unit. Further still, it should be understood that compute elements and acceleration elements in the network device 200 or edge resources 150, 152, 154 may be separate from one another, e.g., on separate network devices.

The network device 200 (or the network devices 130, 132, 134), edge gateway device 114, edge resources 150, 152, 154 (e.g., the compute devices 160, 164, 168 and accelerator devices 162, 166, 170), the edge device 110, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
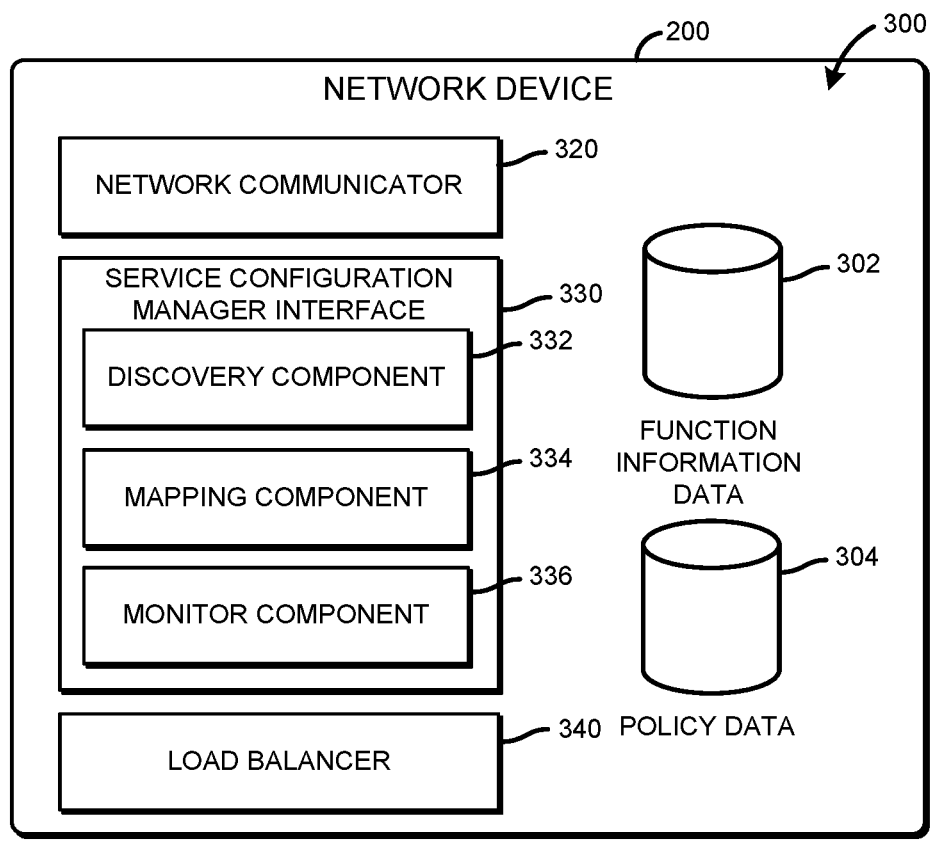
FIG. 3 is a simplified block diagram of at least one embodiment of an environment that may be established by the network device of FIGS. 1 and 2.

Referring now to FIG. 3, the network device 200 may establish an environment 300 during operation. The illustrative environment 300 includes a network communicator 320, a service configuration manager interface 330, and a load balancer 340. Each of the components of the environment 300 may be embodied as hardware, firmware, software, or a combination thereof. In some embodiments, one or more of the components of the environment 300 may be embodied as circuitry or a collection of electrical devices (e.g., network communicator circuitry 320, service configuration manager interface circuitry 330, load balancer circuitry 340, etc.). It should be appreciated that, in such embodiments, one or more of the network communicator circuitry 320 or service configuration manager interface circuitry 330 may form a portion of the load balancer circuitry 340 (or other components of the network device 200). It should further be appreciated that, in such embodiments, one or more of the network communicator circuitry 320 or load balancer circuitry 340 may form a portion of the load balancer logic unit 221 (or other components of the network device 200).

The environment 300 also includes function information data 302, which may be embodied as any data indicative of functions provided by each edge resource (e.g., compute devices) registered with the network device 200. For example, the function information data 302 may be embodied as a table structure including a registered compute device and associated FaaS services. The function information data 302 may also provide metadata describing the capabilities of a given device (e.g., compute resources, memory resources, network resources, and the like). The environment 300 further includes policy data 304, which may be embodied as any data indicative of service level agreements (SLA) associated with users in the system 100, quality-of-service (QoS) requirements, load balancing policies, and the like.

In the illustrative embodiment, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the devices in the system 100. To do so, the network communicator 320 is configured to receive and process data packets from one system or computing device (e.g., the edge gateway device 114) and to prepare and send data packets to another computing device or system (e.g., the edge resources 150, 152, 154). Accordingly, in some embodiments, at least a portion of the functionality of the network communicator 320 may be performed by the communication circuitry 218, and, in the illustrative embodiment, by the NIC 220.

In the illustrative embodiment, the service configuration manager interface 330 is configured to perform the operations described herein, including receiving a request to access a function, identifying one or more edge resources to service the request, selecting the identified edge resources according to the policy data 304, and sending the request to the selected edge resource. To do so, the service configuration manager interface 330 includes a discovery component 332, a mapping component 334, and a monitor component 336. The service configuration manager interface 330 may provide an API that is accessible by a user (e.g., a data center operator) to configure the network device 200 with a variety of edge resources, such as compute devices.

The discovery component 332 is configured to identify and register edge resources (e.g., compute devices forming the edge resources) with the network device 200. In an embodiment, the discovery component 332 may update the function information data 302 with information describing a given edge resource, such as a device ID, network address (e.g., media access control (MAC), IP address, etc.), accelerator devices configured on the device, and the like. The discovery component 332 may also update the function information data 302 with FaaS functions registered on the edge resource.

The mapping component 334 is configured to map functions (or a group of functions) associated with one or more devices to a given service queue (or a function or group of functions). The mapping component 334 may also assign a resource monitoring identifier to the service queue. The resource monitoring identifier may be used by services and other components in the system 100 to obtain telemetry and other metrics associated with the service queue. Doing so enables the service configuration manager interface 330 to define a resource monitoring identifier for a variety of classes of service. The telemetry monitoring using the resource monitoring identifier may be carried out through various telemetry collection techniques, such as the Intel® Resource Director Technology. The mapping component 334 may also define a resource monitoring identifier for a function or a group of functions. The monitor component 336 is configured to obtain telemetry data from each service queue. To do so, the monitor component 336 may access a service queue telemetry using the resource monitoring identifier associated with the service queue. Once accessed, the monitor component 336 may retrieve and store the telemetry data (e.g., in a data storage device in the network device 200).

The illustrative load balancer 340 is configured to receive requests from the edge gateway device 114 (or application) for accessing edge resources to perform processing tasks. The load balancer 340 may apply one or more load balancing policies to the requests to determine an appropriate destination for the request. Further, the load balancer 340 evaluates telemetry obtained from service queues to further determine the appropriate destination, e.g., to determine which of the edge resources may, based on an evaluation of the telemetry data, be available to service the request, e.g., according to a given SLA. Note, the load balancer 340 may be implemented in various hardware and circuitry of the network device 200, such as within the NIC 220 or as a component in the communication circuitry 218.

Figure 4:
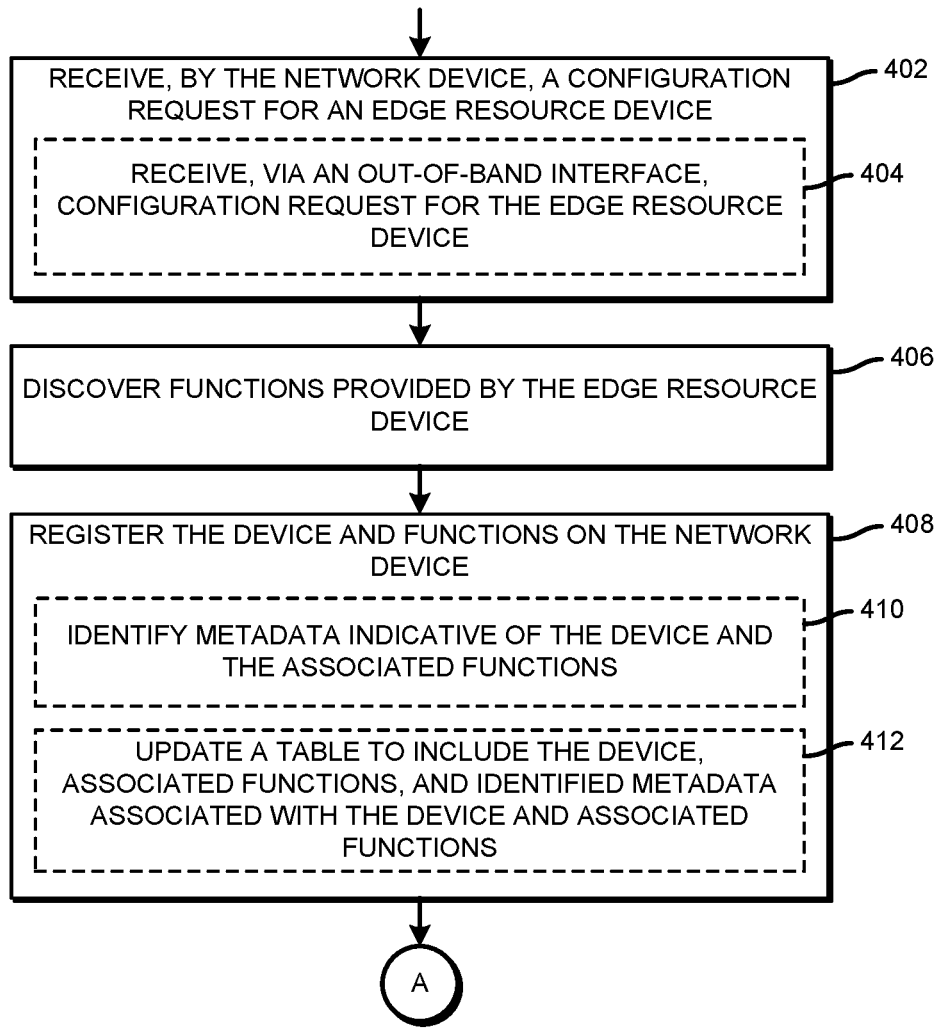
FIG. 4 is a simplified flow diagram of at least one embodiment of a method that may be performed by the network device of FIGS. 1 and 2 for registering an edge resource with the network device of FIGS. 1 and 2.

Referring now to FIG. 4, the network device 200, in operation, performs a method 400 for registering an edge resource with the network device 200. As shown, the method 400 begins in block 402, in which the network device 200 receives a configuration request for an edge resource device (e.g., one of the compute devices 160, 164, 168 or accelerator devices 162, 166, 170). For example, in block 404, the network device 200 receives, via an out-of-band interface provided to a user, a configuration request for the device.

In block 406, the network device 200 discovers functions provided by the edge resource device. For example, to do so, the network device 200 may execute a discovery service to identify function-as-a-service (FaaS) functions provided by the edge resource device. In other cases, the edge resource device may communicate (e.g., via an API) data indicative of the FaaS functions to the network device 200. In block 408, the network device 200 registers the device and associated FaaS functions thereon. For instance, to do so, in block 410, the network device 200 identifies metadata indicative of the device and the associated functions. Examples include device information (e.g., device ID, type, etc.), network addressing information (e.g., a MAC address, an IP address, etc.), service provider ID, and the like. In block 412, the network device 200 updates a table (e.g., the function information data 302) to include the device, associated functions, and identified metadata associated with the device and functions.

Figure 5:
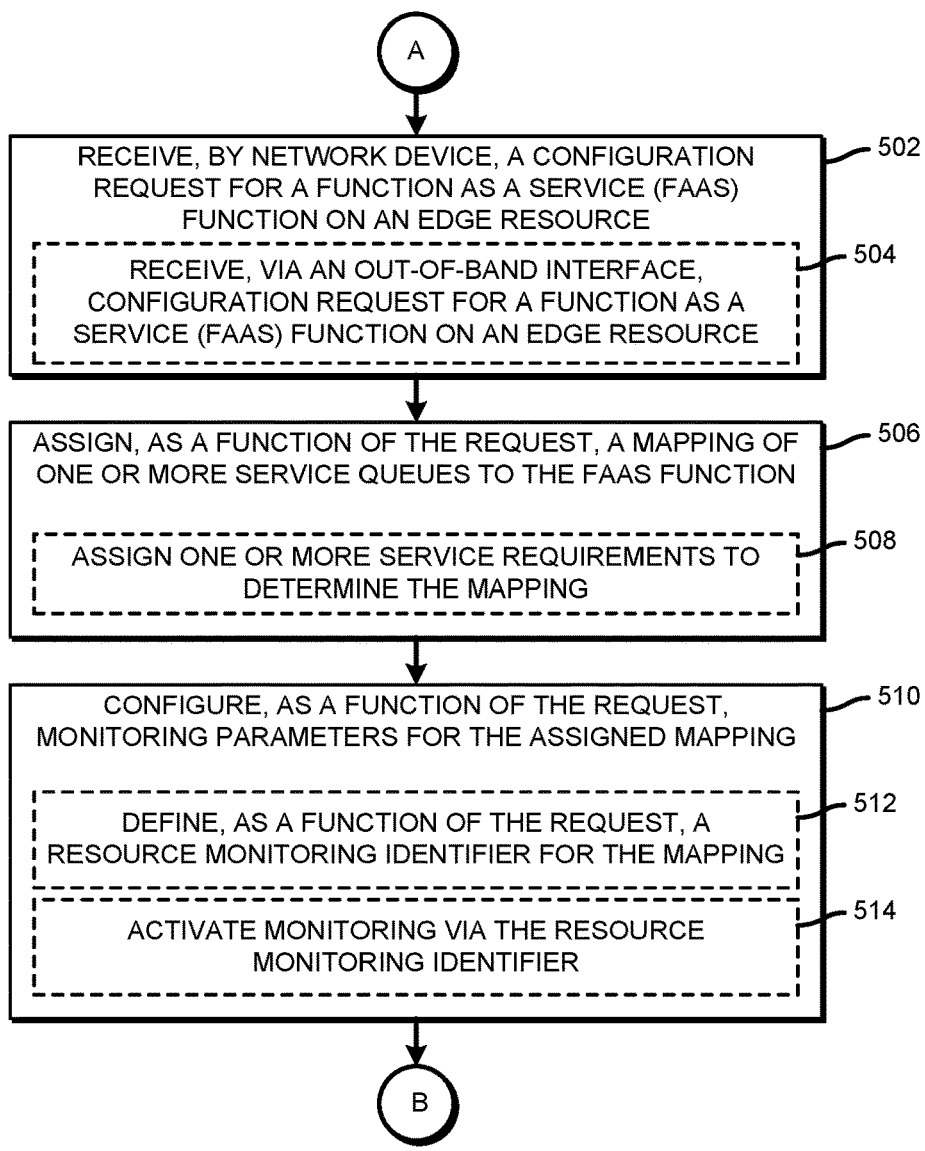
FIG. 5 is a simplified flow diagram of at least one embodiment of a method that may be performed by the network device of FIGS. 1 and 2 for registering functions associated with an edge resource with the network device of FIGS. 1 and 2.

Referring now to FIG. 5, the network device 200, in operation, performs a method 500 for registering functions associated with an edge resource with the network device 200. As shown, the method 500 begins in block 502, in which the network device 200 receives a configuration request for a FaaS function on an edge resource device (e.g., one of the compute devices 160, 164, 168 or accelerator devices 162, 166, 170) registered with the network device 200. The configuration request may correspond to, for example, a mapping of a FaaS function (or group of FaaS functions) of one or more edge resources to a service queue subject to various service requirements (e.g., SLA, QoS, and class of service (CLoS) requirements). For instance, to do so, in block 504, the network device 200 receives, via an out-of-band interface accessible to a user, a configuration request for a FaaS function (or a group of FaaS functions) associated with one or more edge resources.

In block 506, the network device 200 assigns, as a function of the request, a mapping of the requested function to a service queue specified in the request. In addition, in doing so, in block 508, the network device 200 assigns one or more of the service requirements specified in the request to the mapped service queue. In block 508, the network device 200 configures, as a function of the request, a mapping of one or more service queues to the function. The mapping may result in one or more functions being mapped to a number of service queues. For example, assume that the network device 200 is connected with edge resources providing functions A, B, C, and D. The network device 200 may map functions A and B to a given service queue, map functions C and D to another service queue, and map functions A and D to yet another service queue.

In block 510, the network device 200 configures, as a function of the request, one or more monitoring parameters for the assigned mapping. For instance, to do so, in block 512, the network device 200 may define, as a function of the request, a resource monitoring identifier to associate with the mapping. In block 514, the network device 200 may activate monitoring using the resource monitoring identifier. The network device 200 may collect telemetry data associated with the service queue via the resource monitoring identifier.

Figure 6:
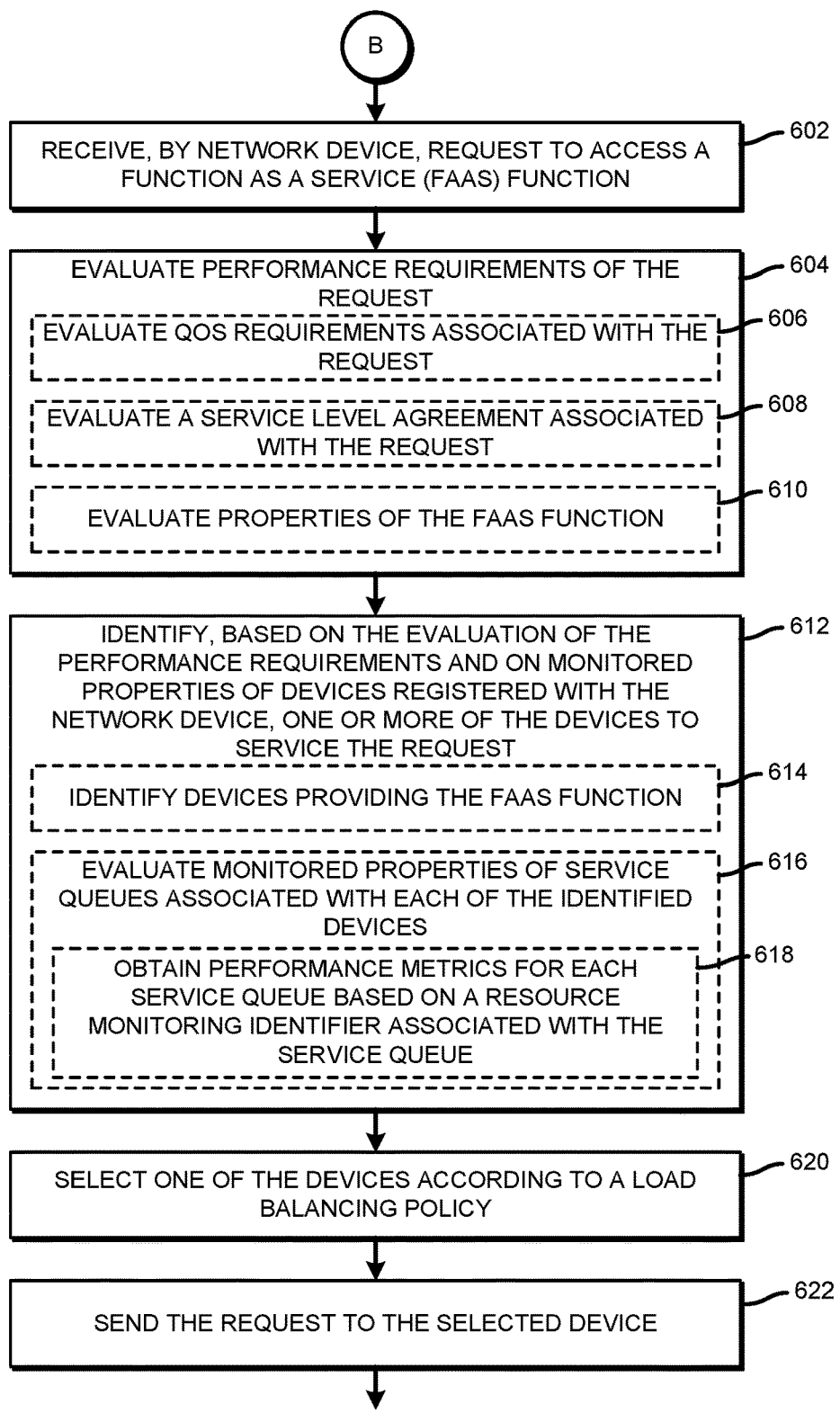
FIG. 6 is a simplified flow diagram of at least one embodiment of a method that may be performed by the network device of FIGS. 1 and 2 for load balancing service requests in an edge network.

Referring now to FIG. 6, the network device 200, in operation, performs a method 600 for load balancing service requests in an edge network. As shown, the method 600 begins in block 602, in which the network device 200 receives a request to access a FaaS function. In an embodiment, the request is sent by one of the edge devices 110 (e.g., via the application 112). In block 604, the network device 200 evaluates the request. For example, in block 606, the network device 200 may evaluate QoS requirements (e.g., QoS deadlines, latency requirements, throughput requirements, etc.) associated with the request. As another example, in block 608, the network device 200 may evaluate a SLA associated with the request to determine performance requirements for the request. As another example, in block 610, the network device 200 may evaluate properties of the FaaS function, such as function type, input parameters, and the like.

In block 612, the network device 200 identifies, based on the evaluation of the performance requirements and on monitored properties of the edge resources registered with the network device 200, one or more edge resource devices to service the request. For example, to do so, in block 614, the network device 200 identifies the edge devices providing the requested FaaS function. The network device 200 may do so by evaluating a table of registered devices (e.g., as provided by the function information data 302). In block 616, the network device 200 evaluates monitored properties of service queues associated with each of the identified devices. For instance, to do so, in block 618, the network device 200 obtains performance metrics and telemetry for each service queue associated with the device. To obtain the telemetry and metrics, the network device 200 may do so based on a resource monitoring identifier associated with the service queue. In block 620, the network device 200 selects one of the devices according to a load balancing policy. Once selected, the network device 200 sends the request to the selected device.

Figure 7:
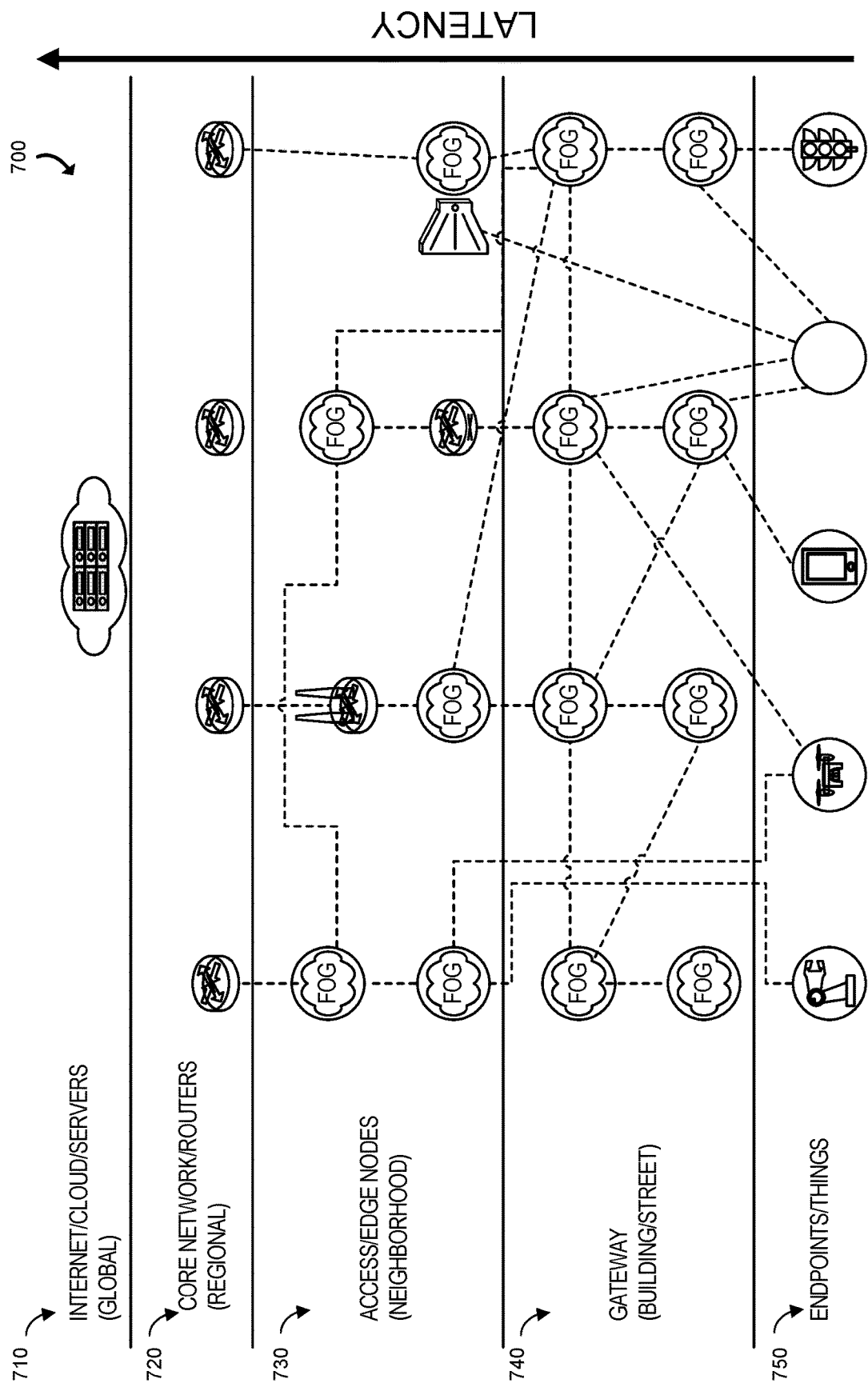
FIG. 7 is a simplified block diagram of a fog and mobile edge computing (MEC) network topology that may be utilized with the system of FIG. 1.

Referring briefly to FIG. 7, a MEC and fog network topology 700 is shown. The network topology 700 includes endpoints (at an endpoints/things network layer 750), gateways (at a gateway layer 740), access or edge computing nodes (e.g., at neighborhood nodes layer 730), core network or routers (e.g., at a regional or central office layer 720). A fog network (e.g., established at the gateway layer 740) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 7 illustrates a general architecture that integrates a number of MEC and fog nodes-categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a network device comprising circuitry to receive, in an edge network, a request to access a function, the request including one or more performance requirements; identify, as a function of an evaluation of the performance requirements and on monitored properties of each of a plurality of devices associated with the network device, one or more of the plurality of devices to service the request; select one of the identified devices according to a load balancing policy; and send the request to the selected device.

Example 2 includes the subject matter of Example 1, and wherein the evaluation of the performance requirements comprises an evaluation of one or more quality-of-service requirements associated with the request.

Example 3 includes the subject matter of any of Examples 1 and 2, and wherein the evaluation of the performance requirements comprises an evaluation of a service level agreement associated with the request.

Example 4 includes the subject matter of any of Examples 1-3, and wherein to identify the one or more of the plurality of devices to service the request comprises to identify one or more of the plurality of devices providing the requested function; and evaluate the monitored properties of a service queue associated with each identified device providing the requested function.

Example 5 includes the subject matter of any of Examples 1-4, and wherein to evaluate the monitored properties of the service queue associated with each identified device providing the requested function comprises to obtain one or more performance metrics for the service queue using a resource monitoring identifier associated with the service queue.

Example 6 includes the subject matter of any of Examples 1-5, and wherein to identify the one or more of the plurality of devices providing the requested function comprises to identify, using a table listing the plurality of devices and functions associated therewith, the one or more of the plurality of devices providing the requested function.

Example 7 includes the subject matter of any of Examples 1-6, and wherein each of the plurality of devices is registered with the network device.

Example 8 includes one or more machine-readable storage media storing instructions, which, when executed on one or more processors, causes a network device to receive, in an edge network, a request to access a function, the request including one or more performance requirements; identify, as a function of an evaluation of the performance requirements and on monitored properties of each of a plurality of devices associated with the network device, one or more of the plurality of devices to service the request; select one of the identified devices according to a load balancing policy; and send the request to the selected device.

Example 9 includes the subject matter of Example 8, and wherein the evaluation of the performance requirements comprises an evaluation of one or more quality-of-service requirements associated with the request.

Example 10 includes the subject matter of any of Examples 8 and 9, and wherein the evaluation of the performance requirements comprises an evaluation of a service level agreement associated with the request.

Example 11 includes the subject matter of any of Examples 8-10, and wherein to identify the one or more of the plurality of devices to service the request comprises to identify one or more of the plurality of devices providing the requested function; and evaluate the monitored properties of a service queue associated with each identified device providing the requested function.

Example 12 includes the subject matter of any of Examples 8-11, and wherein to evaluate the monitored properties of the service queue associated with each identified device providing the requested function comprises to obtain one or more performance metrics for the service queue using a resource monitoring identifier associated with the service queue.

Example 13 includes the subject matter of any of Examples 8-12, and wherein to identify the one or more of the plurality of devices providing the requested function comprises to identify, using a table listing the plurality of devices and functions associated therewith, the one or more of the plurality of devices providing the requested function.

Example 14 includes the subject matter of any of Examples 8-13, and wherein each of the plurality of devices is registered with the network device.

Example 15 includes a network device, comprising circuitry for receiving, in an edge network, a request to access a function, the request including one or more performance requirements; means for identifying, as a function of an evaluation of the performance requirements and on monitored properties of each of a plurality of devices associated with the network device, one or more of the plurality of devices to service the request; means for selecting one of the identified devices according to a load balancing policy; and circuitry for sending the request to the selected device.

Example 16 includes the subject matter of Example 15, and wherein the evaluation of the performance requirements comprises an evaluation of one or more quality-of-service requirements associated with the request.

Example 17 includes the subject matter of any of Examples 15 and 16, and wherein the evaluation of the performance requirements comprises an evaluation of a service level agreement associated with the request.

Example 18 includes the subject matter of any of Examples 15-17, and wherein the means for identifying the one or more of the plurality of devices to service the request comprises means for identifying one or more of the plurality of devices providing the requested function; and means for evaluating the monitored properties of a service queue associated with each identified device providing the requested function, wherein the means for evaluating the monitored properties comprises circuitry for obtaining one or more performance metrics for the service queue using a resource monitoring identifier associated with the service queue.

Example 19 includes the subject matter of any of Examples 15-18, and wherein the means for identifying the one or more of the plurality of devices providing the requested function comprises means for identifying, using a table listing the plurality of devices and functions associated therewith, the one or more of the plurality of devices providing the requested function.

Example 20 includes the subject matter of any of Examples 15-19, and wherein each of the plurality of devices is registered with the network device.

What is claimed is:

1. A network device comprising:
   memory; and
   at least one processor to execute machine-readable instructions to at least:
   receive, in an edge network, a request to access a function, the request including one or more performance requirements;
   identify, as a function of an evaluation of the performance requirements and on monitored properties of each of a plurality of devices associated with the network device, one or more of the plurality of devices to provide the requested function;
   evaluate the monitored properties of a service queue associated with each identified device that is to provide the requested function, wherein the monitored properties include at least one or more performance metrics for the service queue, the evaluation at least to use a resource monitoring identifier associated with the service queue;
   select one of the identified devices according to a load balancing policy; and
   send the request to the selected device.

2. The network device of claim 1, wherein the evaluation of the performance requirements includes an evaluation of one or more quality-of-service requirements associated with the request.

3. The network device of claim 1, wherein the evaluation of the performance requirements includes an evaluation of a service level agreement associated with the request.

4. The network device of claim 1, wherein to identify the one or more of the plurality of devices providing the requested function, the at least one processor is to identify, using a table listing the plurality of devices and functions associated therewith, the one or more of the plurality of devices providing the requested function.

5. The network device of claim 1, wherein each of the plurality of devices is registered with the network device.

6. One or more machine-readable storage media storing instructions, which, when executed on one or more processors, causes a network device to:
   receive, in an edge network, a request to access a function, the request including one or more performance requirements;
   identify, as a function of an evaluation of the performance requirements and on monitored properties of each of a plurality of devices associated with the network device, one or more of the plurality of devices to provide the requested function;
   evaluate the monitored properties of a service queue associated with each identified device that is to provide the requested function, wherein the monitored properties include at least one or more performance metrics for the service queue, the evaluation at least to use a resource monitoring identifier associated with the service queue;
   select one of the identified devices according to a load balancing policy; and
   send the request to the selected device.

7. The one or more machine-readable storage media of claim 6, wherein the evaluation of the performance requirements includes an evaluation of one or more quality-of-service requirements associated with the request.

8. The one or more machine-readable storage media of claim 6, wherein the evaluation of the performance requirements includes an evaluation of a service level agreement associated with the request.

9. The one or more machine-readable storage media of claim 6, wherein the instructions, when executed, cause the network device to identify, using a table listing the plurality of devices and functions associated therewith, the one or more of the plurality of devices providing the requested function.

10. The one or more machine-readable storage media of claim 6, wherein each of the plurality of devices is registered with the network device.

11. A network device, comprising:
    circuitry for receiving, in an edge network, a request to access a function, the request including one or more performance requirements;
    means for identifying, as a function of an evaluation of the performance requirements and on monitored properties of each of a plurality of devices associated with the network device, one or more of the plurality of devices to provide the requested function;
    means for evaluating the monitored properties of a service queue associated with each identified device that is to provide the requested function, wherein the means for evaluating the monitored properties comprises circuitry for obtaining one or more performance metrics for the service queue using a resource monitoring identifier associated with the service queue;
    means for selecting one of the identified devices according to a load balancing policy; and
    circuitry for sending the request to the selected device.

12. The network device of claim 11, wherein the evaluation of the performance requirements includes an evaluation of one or more quality-of-service requirements associated with the request.

13. The network device of claim 11, wherein the evaluation of the performance requirements includes an evaluation of a service level agreement associated with the request.

14. The network device of claim 11, wherein the means for identifying the one or more of the plurality of devices providing the requested function includes means for identifying, using a table listing the plurality of devices and functions associated therewith, the one or more of the plurality of devices providing the requested function.

15. The network device of claim 11, wherein each of the plurality of devices is registered with the network device.

* * * * *